T. HEERMANS
Cultivator.
No. 23,170.  Patented Mar. 8, 1859.
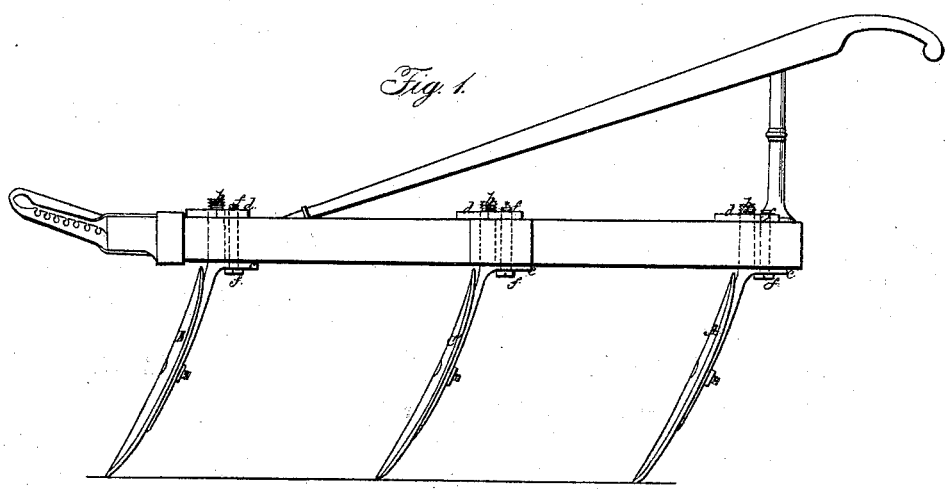
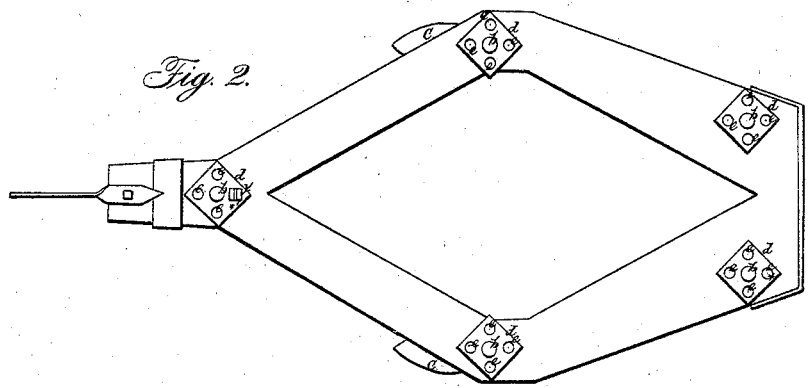
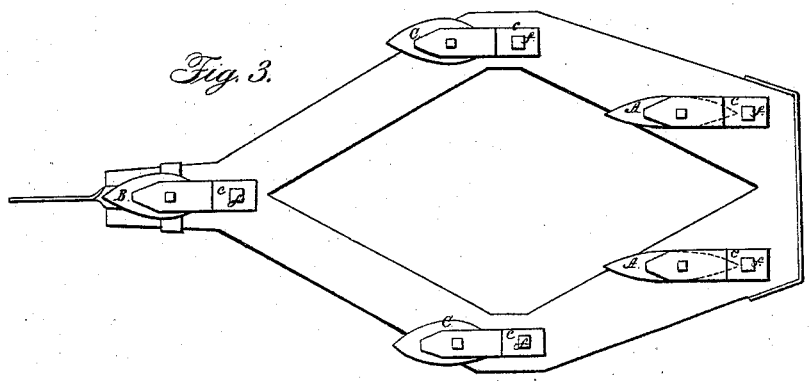
Witnesses:
Inventor:

UNITED STATES PATENT OFFICE.

THEODORE HEERMANS, OF MITCHELLSVILLE, TENNESSEE.

IMPROVEMENT IN CULTIVATORS.

Specification forming part of Letters Patent No. 23,170, dated March 8, 1859.

*To all whom it may concern:*

Be it known that I, THEODORE HEERMANS, of Mitchellsville, in the county of Sumner and State of Tennessee, have invented a new and useful Improvement in Cultivators; and I do hereby declare that the following is a full, clear, and exact description of the same, reference being had to the accompanying drawings, forming a part of this specification, in which—

Figure 1 is a side view of a cultivator constructed with my improvements. Fig. 2 is a plan or top view of the same, and Fig. 3 is an inverted plan of the same.

Similar letters of reference in each of the several figures indicate corresponding parts.

In all cultivators with which I am familiar the teeth are all made of the same size or width, and owing to this mode of construction the hind teeth, which are used for closing in the furrows formed by the front and intermediate teeth, form furrows just as wide as those of the front and intermediate teeth, and said furrows are left open, and the ground consequently is left full of large furrows, instead of being left in a level condition.

My invention is designed to overcome this difficulty, and the nature of the same consists in making the hindmost teeth, A A, much smaller, or of considerable less width than the front tooth, B, and intermediate teeth, C C, and arranging the same so that they stand out beyond the side edges of the front tooth and in beyond the inner side edges of the intermediate teeth, as exhibited in the drawings. The advantages of this feature of my invention are these:

First, I am enabled to have the front teeth as wide and as strong as may be necessary.

Second, the ground will be nearly all broken by the front and intermediate teeth, and there will be very little strain on the rear ones, and they being narrow will simply split the ridges and fill up the furrows formed by the wide teeth without forming and leaving wide furrows in the ground. Thus the ground will be left with a sufficiently uniform surface to prevent the land from "washing," and yet not so level as to allow it to bake.

Third, it avoids the additional expense of using a greater number of teeth of small and uniform size for accomplishing the same result, it costing nearly as much to make a small tooth as it does to make a large one. Besides, small teeth are weaker and less durable.

It is an established fact with farmers that deep and close plowing goes toward retaining moisture and prevents washing, and hence the importance of not having the soil left with wide furrows will be seen.

My invention consists, second, in the combination of the screw-shank *b* and flange or shoulder *c* of the teeth with the screw-nut *d*, having a series of auxiliary screw-tapped holes, *e e*, and with the auxiliary screw *f*, as shown in the drawings. By this feature of my invention the teeth are effectually prevented from getting loose and breaking off at the shank, for the auxiliary screw prevents all possibility of the nut turning or unscrewing; and in case, from a long use and from shrinkage or other cause, the nut and tooth should get loose, the same can be tightened up by removing the auxiliary screw, turning the nut, and inserting the auxiliary screw in a new hole.

It is a common objection to the cultivators in use that the screws, keys, and wedges employed for fastening the teeth work loose and allow the teeth to move in such a manner that they break off or bend at their shanks. Indeed, more expense results from just this one thing than from all others.

In the drawings, at *, I have shown the auxiliary screws as coming up from the under side of the cultivator-frame, and at *' I have shown them as passing down from the top of the frame. The passing of the screws up through the frame is best in practice, as thereby the flange or shoulder of the teeth is more firmly braced and confined, and the nut still as effectually prevented from turning or unscrewing.

What I claim as my invention, and desire to secure by Letters Patent, is—

1. The screw-tapped shoulder or flange *c* and screw-shank *b* of the cultivator-teeth, in combination with the screw-nut *d*, having a series of auxiliary screw-tapped holes *e e*, and with the separate auxiliary screw *f*, in the manner and for the purpose herein described.

2. In combination with the above, the specified arrangement of large and small cultivator-teeth, A B C, for the purposes herein described.

THEO. HEERMANS.

Witnesses:
G. YORKE AT LEE,
L. A. DOLE.